(12) United States Patent
Pellenc

(10) Patent No.: US 10,617,058 B2
(45) Date of Patent: Apr. 14, 2020

(54) ANTICIPATIVE ELECTRIC MOWER AND METHOD OF PILOTING SUCH A MOWER

(71) Applicant: PELLENC (Societe Anonyme), Pertuis (FR)

(72) Inventor: Roger Pellenc, Pertuis (FR)

(73) Assignee: PELLENC, Pertuis (FR)

( * ) Notice: Subject to any disclaimer, the term of this patent is extended or adjusted under 35 U.S.C. 154(b) by 164 days.

(21) Appl. No.: 15/767,324

(22) PCT Filed: Dec. 6, 2016

(86) PCT No.: PCT/FR2016/053226
§ 371 (c)(1),
(2) Date: Apr. 10, 2018

(87) PCT Pub. No.: WO2017/109318
PCT Pub. Date: Jun. 29, 2017

(65) Prior Publication Data
US 2018/0303026 A1  Oct. 25, 2018

(30) Foreign Application Priority Data

Dec. 23, 2015 (FR) ..................... 15/63187

(51) Int. Cl.
*A01D 34/00* (2006.01)
*A01D 34/58* (2006.01)
*A01D 34/78* (2006.01)
*A01D 101/00* (2006.01)

(52) U.S. Cl.
CPC ......... *A01D 34/008* (2013.01); *A01D 34/006* (2013.01); *A01D 34/58* (2013.01); *A01D 34/78* (2013.01); *A01D 2101/00* (2013.01)

(58) Field of Classification Search
CPC .. A01B 79/005; A01D 34/008; A01D 34/006; A01D 34/58; A01D 34/37; A01D 34/78; A01G 25/00
USPC ......... 56/10.2 A, 10.2 R, 202, 229; 700/250, 700/258, 245, 284, 259; 701/23, 25, 50
See application file for complete search history.

(56) References Cited

U.S. PATENT DOCUMENTS

| | | | | | |
|---|---|---|---|---|---|
| 3,924,389 | A | * | 12/1975 | Kita ..................... | A01D 34/008 56/10.2 A |
| 4,694,639 | A | * | 9/1987 | Chen ................... | A01D 34/008 250/202 |
| 7,191,583 | B2 | * | 3/2007 | Fukushima .......... | A01D 34/006 56/10.2 R |
| 8,295,979 | B2 | * | 10/2012 | Thacher ............... | A01G 25/00 700/250 |

(Continued)

*Primary Examiner* — Robert E Pezzuto
(74) *Attorney, Agent, or Firm* — Egbert Law Offices, PLLC

(57) ABSTRACT

An electric mower of the battery-operated type has at least one cutting blade, an electric motor for driving the cutting blade, and an electronic piloting unit for the electric motor. At least one optical sensor is deposited upstream of the cutting blade. The optical sensor is configured to deliver; as the mower advances, at least one predictive signal of a quantity of plants to be cut. The electronic piloting unit is configured to establish an optimum rotation speed of the drive motor of the cutting blade, of said predictive signal of the optical sensor, and of a speed of advance of the mower. The method and apparatus are applicable at least to walk-behind mowers.

19 Claims, 4 Drawing Sheets

(56) References Cited

U.S. PATENT DOCUMENTS

| | | | |
|---|---|---|---|
| 8,666,550 B2* | 3/2014 | Anderson | A01D 34/008 700/253 |
| 9,609,858 B2* | 4/2017 | Stowe | A01D 34/015 |
| 2008/0109126 A1* | 5/2008 | Sandin | G05D 1/0225 701/23 |
| 2012/0228041 A1* | 9/2012 | Borinato | A01D 34/78 180/65.31 |

* cited by examiner

ANTICIPATIVE ELECTRIC MOWER AND METHOD OF PILOTING SUCH A MOWER

TECHNICAL FIELD

The present invention relates to an electric mower of the battery-operated type. By electric mower one means a mower the blade or blades of which is or are driven by an electric motor. The invention relates more precisely to an anticipative mower capable of determining automatically a mowing task and to adapt its operation to this task. It also relates to a method of piloting the drive motor of the cutting blade(s) of the mower.

The invention finds application particularly on walk-behind or riding mowers for the upkeep of public or private green spaces.

STATE OF PRIOR ART

Known anticipative mowers are generally robotic mowers capable of moving autonomously over a terrain to be mowed. The anticipative function of these mowers generally consists of distinguishing grassy surfaces to be mowed from surfaces to be avoided. It consists particularly of distinguishing areas already mowed from areas still to be mowed.

Such mowers are known, for example, from the following documents: U.S. Pat. No. 3,924,389, US 2008/0109126 and DE 19,932,552. They are equipped with various sensors mounted on the front side of the mower housing, i.e. upstream of the area to be covered by the cutting blade. The sensors are used to determine the presence of grass and, as the case may be, the height of the grass or a density of grass to be mowed.

These parameters have been taken into account in order to optimize the travel of the mower in terms of trajectory or travel speed.

DISCLOSURE OF THE INVENTION

It is the aim of the invention to propose an anticipative lawn mower, and in particular a walk-behind mower or a riding mower, capable of not only improving the mowing performance but also the operator's comfort.

The aim of the invention is in particular to propose a mower that can be used, to a large extent at a constant forward speed. The invention intends to liberate the operator of the mower from the constant worry over changing the forward speed of the mower depending on the height or density of the grass the cutting blade is about to cut.

The invention also aims to propose an electric mower with an improved mowing range for a given capacity of a supply battery. The invention aims to bring the energy consumed by the mower into the vicinity of the strict minimum required for mowing the vegetation encountered.

The invention also aims to propose an electric mower with reduced operating noise. The invention aims to reduce as much as possible the noise sources of the mower and, here too, to the strict minimum required for mowing the vegetation encountered.

In order to attain these goals, the invention relates more precisely to an electric, battery-operated mower including:
At least one cutting blade,
an electric drive motor for the cutting blade,
an electronic control unit for the electric drive motor of the cutting blade, and
at least one optical sensor placed upstream of the cutting blade.

According to the invention,
the optical sensor is oriented towards the ground with an inclination in a forward direction of the mower, and configured to deliver, during the forward movement of the mower, at least one usable predictive signal to determine, upon processing, at least either a height of plants to cut, or a density of plants to cut, or a combination of height and density of plants to cut,
the electronic control unit is configured to establish an optimal rotation speed of the drive motor of the cutting blade, the optimal rotation speed being established according to said predictive signal of the optical sensor, and of the forward speed of the mower, selected among a standard forward speed, an effective forward speed, and a desired forward speed.

The Mower is Preferably a Walk-Behind Mower.

The mower may feature one or several cutting blades driven by an electric motor. Each blade may be mounted in rotation around a rotary shaft that may be horizontal (for example for a helical drum) or vertical (cutting blades, cutting disc, . . . ) but may also be an alternative cutting blade. When the mower includes several cutting blades, each cutting blade may be associated to one electric motor. A single electric motor may also be coupled to all cutting blades. In the text below, the reference to a plurality of cutting blades does not prejudge a possible manufacture of a mower with a single cutting blade.

The cutting blades are preferably rotary blades, and may be housed in a cutting casing, for example a cutting casing suspended below a mowing deck.

The electronic control unit of the motor is primarily intended to manage the power supply to the electric drive motor of the blades and to control its speed of rotation. In the case of a plurality of cutting blades, each associated to an electric motor, the electronic control unit is provided for managing the power supply to all the motors. In the case of a multi-phase brushless motor it allows for example supplying power to the various phases of the motor in accordance with sequences for controlling the rotation and especially the speed of rotation of the motor. The electronic control unit of the motor may be supplied with one or several electronic cards to which may be assigned, as the case may be, other control functions of the mower, described further down.

The optical sensor or sensors of the mower may be sensitive to wavelengths of the visible light spectrum, in the infrared spectrum, and in particular in the near-infrared spectrum. The range of wavelengths is for instance between 400 nm and 1,200 nm. Further down in the description, and for the sake of simplification, reference is made to a single sensor. One should however keep in mind that the mower can be equipped with several sensors, and in particular with two redundant sensors.

Advantageously the sensor may be associated to a light source intended to light a target measuring area of the sensor in front of the culling blade. It may be integrated in the sensor or be separate from the sensor. It preferably covers all or part of the range of wavelength in which the optical sensor is sensitive. The light source is preferably a light source drawn in a manner so as to distinguish a response of the optical sensor to the illumination of the light source from, for example, a response of the sensor to continuous daylight.

The optical sensor may be an advanced sensor such as an image sensor or even a camera which are capable to form, after processing, an electronic, more or less detailed image of the plants to be mowed. In a more economical version, the sensor may be a simple sensor of the proximity type sensor. As an illustration, it may be a sensor of the ADPS-9190 type available from Avago Technologies Company. This is an integrated component including both an infrared electroluminescent diode capable of illuminating the measurement zone of the sensor, and of one or several photodiodes capable of measuring the reflected or backscattered light from the measurement zone.

The signal delivered by the optical sensor of the mower is used, after processing to evaluate in a predictive manner a quantity of plants, of grass for example, likely to reach the blade(s) of the mower. This evaluation must take place before the plants reach the blades so as to allow the electric motor and the blades to obtain the optimum rotary speed determined in accordance with the invention.

Two dispositions are envisaged to adequately anticipate the evaluation of the quantity of plants to mow. A first disposition consists of placing the optical sensor so as to establish a measurement zone upstream of the blades. The term upstream is to be understood in relation to a forward direction of the mower on a surface to be mowed. The measurement zone is therefore situated ahead of a cutting zone of the mower, and, when it is so equipped, in front of a cutter casing housing the cutting "paddles"' [blades], The measurement zone of the optical sensor is located at a distance from the cutting casing between, for example 10 and 30 cm, and measured parallel to the forward motion of the mower.

A second disposition intended to anticipate the evaluation of the vegetation, consists of giving a sensor an inclination in the direction of the forward movement of the mower. The forward direction is understood to be the direction going, when the mower is in use, from an area already mowed to an area still to be mowed ahead of the mower. More precisely, the sensor is preferably attached to the mower above a cutting plane of the cutting blades. It is preferably attached in a sufficiently high position to be above the plants possibly bent downwards which enter into the cutter casing. It is then oriented towards the ground while having an inclination or at least a tilt component in the forward direction. The optical sensor presents, for example, a measurement axis tilted in a forward direction of the mower. An angle of inclination of the sensor relative to the cutting plane according to which the cutting blade(s) is or are fitted is preferably between 15 and 75 degrees, measured under the cutting plane.

As mentioned earlier, the signal of the optical sensor is representative of a height of plants to be mowed, of a density of plants to be mowed or a combination of the height and the density. The angle of inclination allows playing with this combination. In effect, an orientation of the sensor closer to the horizontal has a tendency, especially for an optical sensor of the proximity sensor type, to promote consideration of the height of the plants to be mowed. In this case, the intensity of the light reflected towards the sensor is all the more important when the plants are high. Inversely, an orientation closer to the vertical has a tendency to promote sensitivity towards the density of the vegetation. In this latter case, the plants reflect the light towards the sensor more than the ground and hence the denser the grass, the greater the intensity of the light reflected towards the sensor.

The signal supplied by the optical sensor can be shaped by an electronic circuit associated to the sensor or by an electronic circuit of an electronic card of the piloting unit. It is used by the electronic piloting unit for the determination of the optimum speed of rotation.

Due to the coupling in rotation of the drive motor and of the cutting blades the optimal rotation speed refers just as much to the optimal rotation speed of the motor as to the optimal rotation speed of the blade.

The optimal rotation speed is determined based on a first parameter which is the quantity of plants to mow, this parameter being established based on the predictive signal of the optical sensor mentioned above and based on a second parameter which is the forward speed of the mower. It becomes in effect clear that the quantity of plants reaching the cutting blade(s) per unit of time, while the mower is moving, depends on the forward speed of the mower.

The forward speed of the mower taken into account for establishing the optimal rotation speed can be an effective forward speed. This is the case, for example, when the mower is a push-type mower. Its speed depends on the walking speed of its operator. In this case, the mower may feature a speed sensor in order to establish a signal of effective forward speed of the mower. The piloting unit is then connected to the speed sensor in order to establish the optimal rotation speed of the blade drive motor. The optimal rotation speed is established based on the predictive signal of the optical sensor and on the signal of effective forward speed. The speed sensor is, for example, a speedometer or a sensor capable of counting a number of rotations of a mower wheel per time unit. When the mower is equipped with a GPS unit, the speed sensor may also be constituted by this unit delivering a speed indication.

The forward speed of the mower taken into account for establishing the optimal rotation speed may also be a speed selected by the operator. This is especially the case when the mower is of the "self-propelled" type. In this case the mower may be equipped with a data entry interface 10 of a desired forward speed for the control of at least one electric motor for propelling the mower forward. The piloting unit is then connected to the data entry interface in order to establish the optimal rotation speed of the blade drive motor based on the predictive signal of the optical sensor and based on the entry of the desired forward speed.

When no speed sensor or data entry interface is present, the forward speed taken into account in order to establish the optimal rotation speed of the blade drive motor may also be a standard speed. That is a set and predetermined speed between, for example, 2 and 5 km/h. The standard speed 20 is recorded as a parameter of the computer program of the piloting unit.

The optimal rotation speed is preferably determined by respecting one or several of the following constraints:
  it must be sufficient to confer to the blade a rotary kinetic moment to enable it to cut the anticipated plant height and density in an appropriate manner and without stalling.
  It must be sufficient for the removal of cut plant material towards a collection bin, if the mower is so equipped.
  It must be minimized in order to reduce the consumption of electric energy of the blade drive motor and to increase the mowing range.
  It must be minimized in order to reduce the acoustic nuisance of the mowing operation, knowing that acoustic nuisance increases with higher speed of the blade rotation.
  It must be below a maximum rotation speed of the motor to prevent the motor from overheating.
  It must be able to accelerate rapidly, especially at peak demand to cope with suddenly dense vegetation.

All these parameters, and still others, can be taken into account in an equation or by optimal speed curves in parametric representation, programmed in software of the piloting unit of the motor.

According to another possibility, the piloting unit may feature a correspondence table programmed with a plurality of reference speeds of rotation of the drive motor, the piloting unit being configured to select the optimal rotation speed of the blade drive motor among the plurality of reference speeds in the reference table.

The correspondence table may be a multidimensional table presenting an entry with ranges of forward speed, and an entry with ranges of plant quantities to be mowed represented by an output value of the signal delivered by the optical sensor. The correspondence table thus presents as outputs associated optimal rotation speeds.

By way of an illustration, for an optical sensor of the proximity measurement type as mentioned previously, the ranges of plant quantities may simply correspond to intensity ranges of the light received by the photodiodes, or ranges of photoelectric current generated by these photodiodes.

The optimal rotation speed of the blade drive electric motor can be reevaluated as the mower moves forward when it is in operation. The reevaluation may be continuous or periodic at regular or irregular intervals.

According to a further development the piloting unit can be configured to establish a value of acceleration, or of deceleration respectively, between a current optimal rotation speed of the blade drive motor and a new optimal rotation speed established during the advancement of the mower.

The acceleration is, for example, proportional to the significance of the variation in the quantity of plants to be mowed. The acceleration is preferably chosen to be:
  Sufficient to enable the motor and the cutting blades to reach the optimal rotation speed in the time interval available between the measurement taken by the optical sensor and the moment when plants seen by the optical sensor reach the blades. This time interval depends on a distance according to the direction of the forward movement between a measuring zone of the optical sensor and a cutting zone of the culling blade(s). The time interval depends also on the forward speed of the mower as described previously.
  Sufficiently slight so as not to cause excessive energy consumption or excessive noise.

The acceleration or deceleration values can also be programmed in an operational software of the piloting unit or they may be predetermined values on a correspondence table of the "look-up table" type.

As indicated above, the piloting unit is preferably configured to establish the acceleration or the deceleration value respectively, based on the forward speed of the mower. In effect, a higher forward speed requires greater reactivity and thus stronger accelerations and decelerations. The forward speed is understood to be either a predetermined standard speed, or an effective speed or a selected reference speed.

According to an interesting particularity of the invention, the mower may feature a signal processing card associated to the optical sensor, the signal processing card being configured to establish a sensor contamination signal. The signal processing card may be in the immediate proximity of the sensor or be part of the electronic cards of the piloting unit of the blade drive electric motor.

The sensor contamination signal may be used to correct the predictive signal of the optical sensor or to trigger a warning when the contamination becomes excessive. The control interface of the mower, may include, for example, a warning indicator, advising the operator to clean the optical sensor.

When the mower comprises a plurality of optical sensors, the signal processing card may be configured to establish a predictive signal based on a measuring signal of each optical sensor, for example by averaging out of all the predictive signals of each sensor. The contribution of each sensor for the establishment of a predictive signal can then be weighted on the basis of the contamination of the sensors, for example, so as to reduce the influence of too heavily contaminated sensors.

The invention relates also to a piloting method of a drive motor for at least one cutting blade of a battery-operated electric mower, including:
  A predictive measurement upstream of the cutting blade, and during a forward move of the mower, of at least either a height of plants, a density of plants or a combination of height and density of plants about to reach the cutting blade,
  the establishment of a forward speed of the mower,
  The setting, as the mower moves forward, of an optimal rotation speed of the drive motor of the cutting blade, the optimal rotation speed being established based on said predictive measurement and based on the forward speed of the mower,
  Electric power supply to the motor with sufficient energy to cause rotation of the drive motor of the cutting blade at the optimal rotation speed.

The electric energy supplied to the drive motor of the blade is thus variable on the basis of the quantity of plants to be mowed, in terms of height and density, and of the forward speed of the mower. In this case as well, the forward speed may be either an effective speed, a selected reference speed or a predetermined standard speed, as described previously.

Special dispositions can be made in a situation where the required speed of rotation would exceed the capacities of a battery supplying energy to the motor, or of a remaining capacity of a partially discharged battery.

In particular, determination by the piloting unit of a situation of capacity being exceeded can be used to:
  Trigger a warning signal to the operator requesting him to temporarily reduce the forward speed or to select a lower forward speed,
  Automatically cause a raise of the cutting height of the cutting blade(s).
  Automatically cause a reduction of the forward speed, if the mower is "self-propelled".

Other characteristics and advantages of the invention will become clear in the following description, with reference to the figures on the attached drawings. This description is given for illustrative purposes and is not limiting.

DETAILED DESCRIPTION OF IMPLEMENTATIONS OF THE INVENTION

Figure 1:
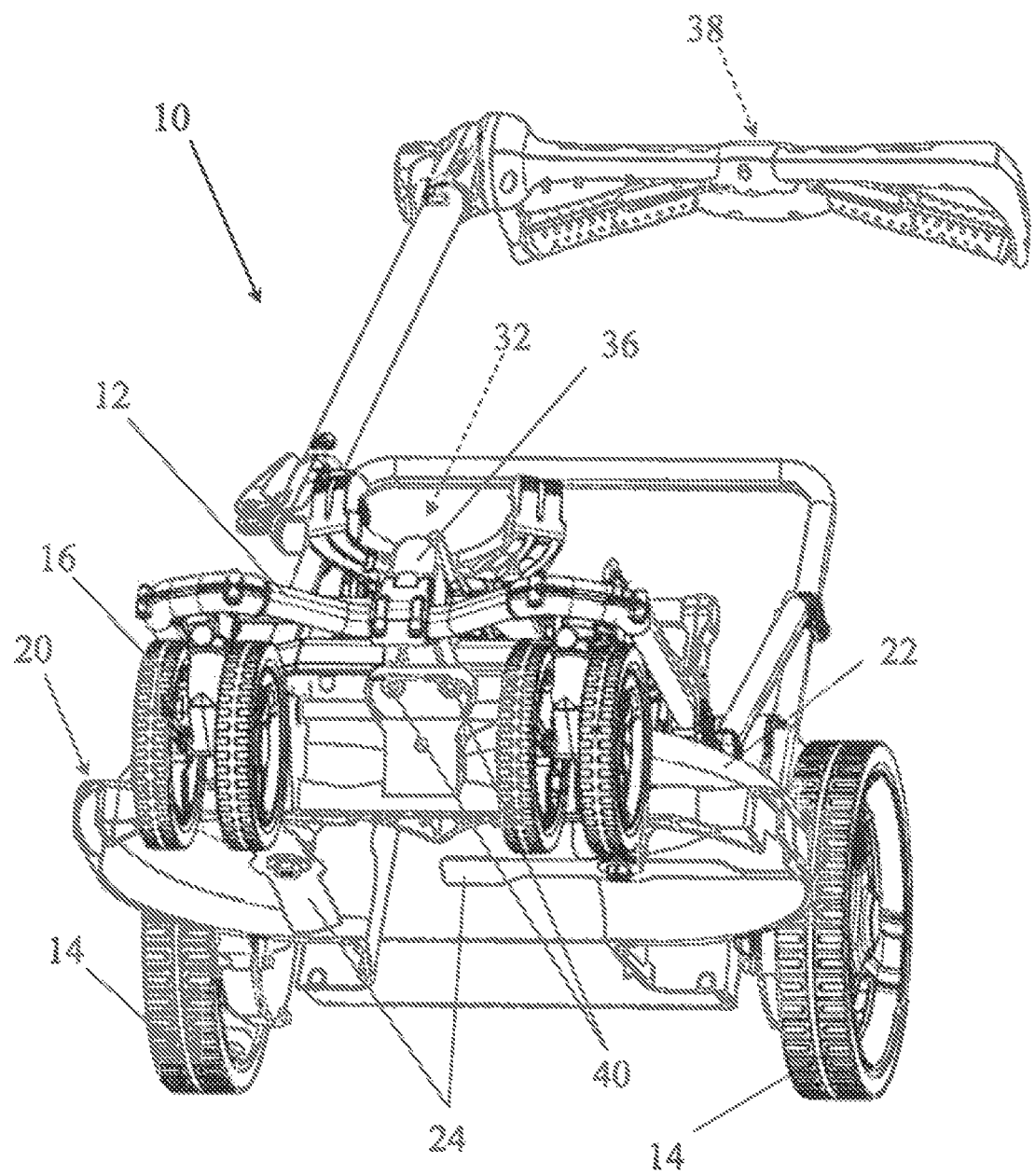
FIG. 1 is a view essentially in the axis of the optical sensor of an electric mower according to the invention.
Figure 2:
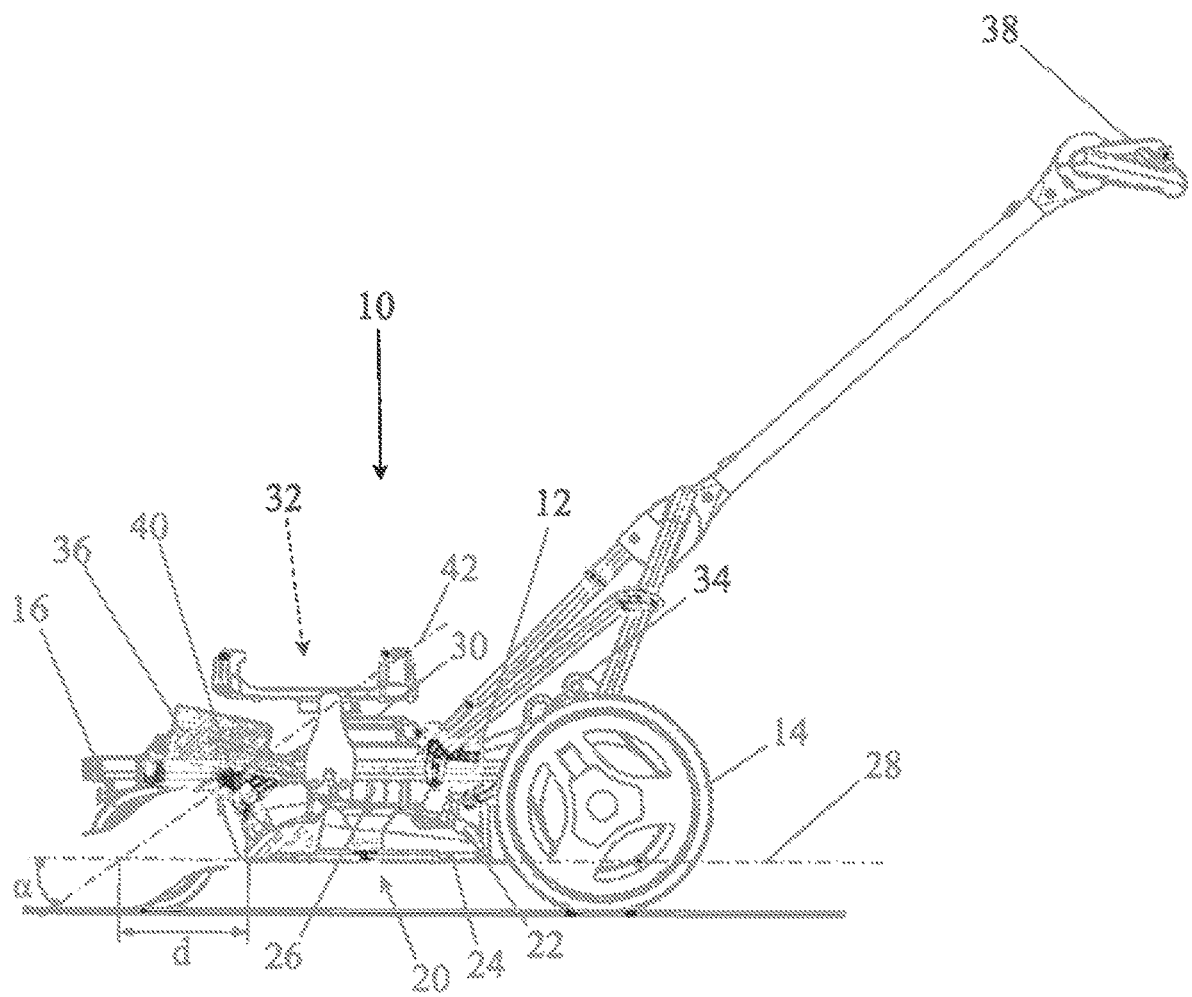
FIG. 2 is a side view of the mower of FIG. 1 with a section view and partial pullout [or removal] at the front end of the mower.

FIGS. 1 and 2 show a walk-behind mower 10 according to the invention.

The mower comprises a tubular frame 12 on which are mounted a drive unit with rear drive wheels 14, front pivoting caster wheels 16 and a mower deck 20. The mower deck 20 includes a cutter casing 22 which houses two cutting blades 24 and an electric motor 26 driving the blades 24. The electric motor 26 is visible on FIG. 2. The cutter casing is mounted on the frame 12 by a parallel linkage fastening system allowing a height adjustment of the cutter casing 22. The cutting blades 24 extend along a cutting plane 28.

The electric motor 26 is for example a brushless motor. A piloting unit 30 of the electric motor includes one or more electronic cards housed under a top cover on top of the electric motor 26. The piloting unit includes in particular power transistors for delivering currents to different windings of the motor. It also allows piloting the rotation speed of the motor by control of the supply currents.

The power supply to the electric motor 26 is provided by a rechargeable electric battery also attached on the tubular frame 12. The location 32 of the battery is indicated on FIGS. 1 and 2 but the battery is not shown. The electric battery can also supply an electric current needed for powering electric motors 34 for propelling the mower forward, coupled respectively to the rear drive wheels 14.

Finally, the battery can supply a current to an electric jack 36 for adjusting the cutting height. The electric jack 36 is able to adjust the height position of the cutter casing 22 and thus of the cutting blades in relation to the frame.

By adjusting the height of the cutter casing the height of the cutting plane 28 relative to the ground can also be set. Adjustment of the cutting height and/or the forward speed of the mower can also be done through an interface 38 located on top of a handlebar of the mower. It is an interface which enables the operator to control the mower and to inform himself of its working condition. The interface 38 may in fact include pilot lamps or other acoustic or visual indicators that are described below. It should be made clear that the cutting height and the forward speed can also be determined automatically as accessory functions of the piloting unit 30 mentioned previously.

A pair of optical sensors 40 is attached in the upper port of the cutter casing 22, i.e. on the part of the cutter casing turned towards the frame so that the sensors are located higher than the plant material entering the cutter housing 22. As an alternative, the optical sensors can also be attached on a tube that is part of the frame. Each optical sensor is provided with an infrared receiver, for example a diode or a transistor, and a infrared LED diode for lighting of the measurement zone. As shown in FIG. 1, the optical sensors are directed towards the ground with an inclination towards a measurement zone. The measurement zone is essentially situated between the front wheels 16.

FIG. 2 shows a measurement axis 42 of the optical sensors. This axis forms an angle α with the cutting plane 28. An intersection point between the measurement axis 42 of the sensors and the cutting plane is located upstream from the cutter casing at a distance d. It corresponds essentially to the distance separating the measurement zone of the optical sensors from the mowing zone of the blades, considered parallel to the forward motion of the mower. The distance d, as well as the angle α, are chosen on the basis of the desired anticipation for the setting of the optimal rotation speed. They also depend on the dimensions of the mower. In the example shown the distance d is in the order of 15 cm and the angle α is in the vicinity of 45 degrees.

The form and extent of the measurement zone of the sensors 40 depend on the sensitivity zone of the IR receivers as well as of the IR lighting zone. This is preferably an elliptic zone. The vegetation, and in particular the blades of grass entering this zone reflect a more or less significant portion of the illumination light towards the sensors, depending on their height and their density. The sensors generate a measuring signal proportionate to the intensity of the light reflected from the measurement zone. In this way the signal is representative of the quantity of plant material that will reach the cutting casing and is used to anticipate the optimal rotation speed of the blade drive motor.

Figure 3:
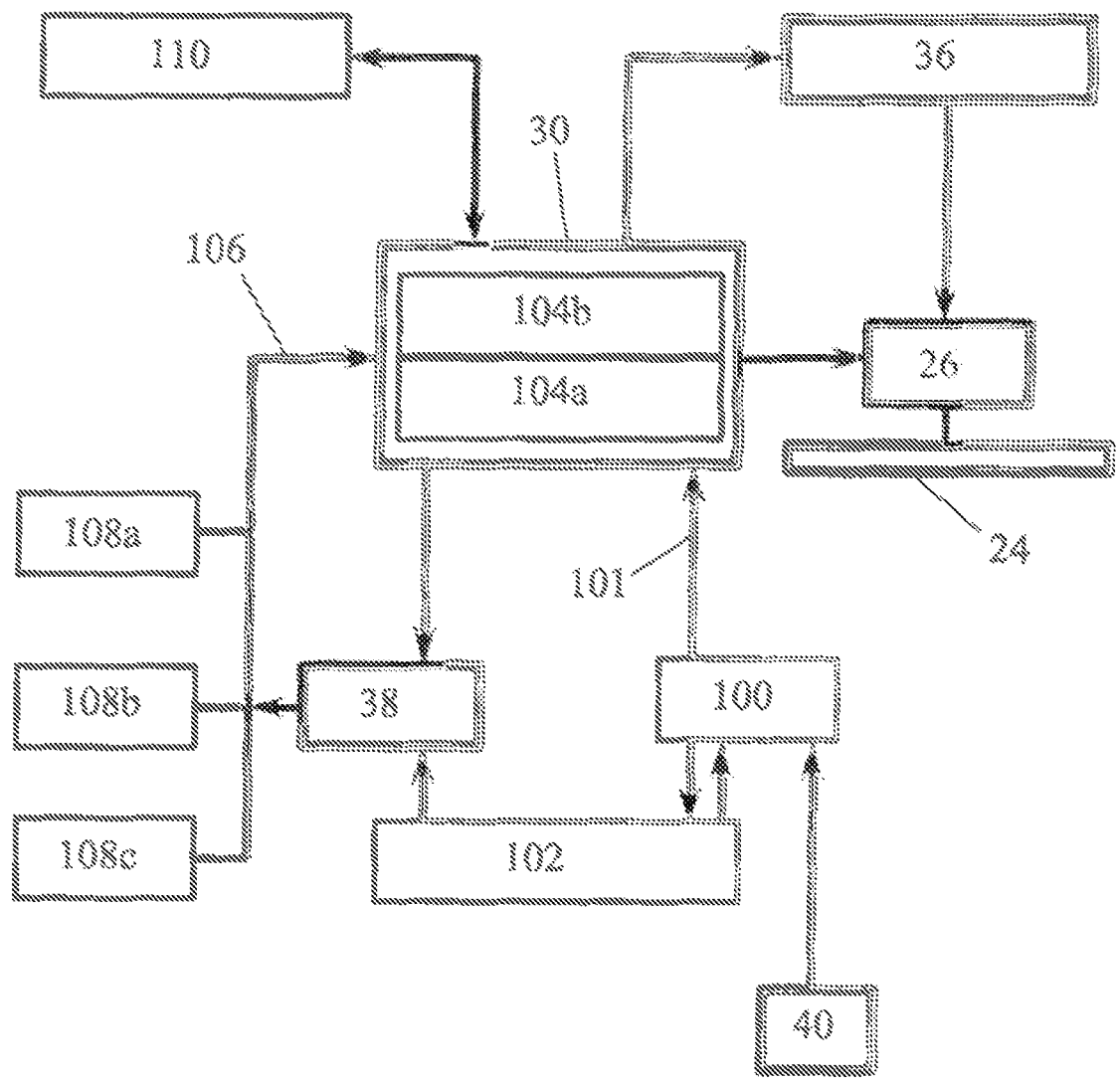
FIG. 3 is a flow-chart illustrating a piloting method of an electric drive motor of a mower blade in accordance with the invention.

The flow-chart of FIG. 3 illustrates the method of setting the optimal rotation speed.

A measurement signal coming from the sensors 40 is being shaped by an electronic circuit which may be integrated in the sensors. The shaping is indicated on FIG. 3 by the reference 100. It is capable to deliver a predictive signal 101 of a quantity of plant material that is going to reach the blades 24 as the mower moves forward. The shaping of the measurement signal may also be used for establishing a signal 102 of contamination of the sensors. The contamination signal 102 can be directed towards an interface indicator 38 of the mower. For example, when the contamination exceeds a set value an acoustic or visual warning may be emitted. The sensor contamination signal may also be used to correct the signal from the sensors during their shaping 100. The predictive signal 101 of the quantity of plant material which will reach the blades is used as a parameter in a step 104a, for setting an optimal rotation speed of the electric blade drive motor. It is also used as a parameter in a combined step 104b for setting an acceleration, and a deceleration respectively of the rotation speed. Acceleration and deceleration are to be understood as between a preceding optimal rotation speed and a following optimal rotation speed during the movement of the mower.

Steps 104a and 104b correspond to operations of the piloting unit 30 of the blade drive motor 26. The piloting takes also into account a forward speed parameter of the mower, indicated by an arrow 106. This is a standard reference speed 108a, a desired forward speed 108b chosen by the operator on the control interface 38 of the mower or an effective forward speed 108c measured by a sensor (not shown) of the drive unit.

The piloting also takes into account the data of a correspondence table 110 or of a corresponding program, for the selection of the optimal speed of the electric blade drive motor 26 among a plurality of predetermined values. The correspondence table puts into relation the parameters of plant material quantity and forward speed with an optimal blade drive speed. The acceleration and deceleration values can also be read in the correspondence table 110.

In case of optimal rotation speed values exceeding the capacities of the electric blade drive motor 26 or of the battery, the piloting unit 30, or a dedicated electronic card can accessorily control the actuation of a jack 36 for a temporary elevation of the cutting height, or the emission of a warning by the interface 38. Establishment of an optimal speed that would exceed the capacities can also be used to act on the control of the drive unit of the mower and cause a temporary reduction of the forward speed of the mower. These measures serve to realign the optimal rotation speed of the blade drive motor with values compatible with the capacities of the mower.

Figure 4:
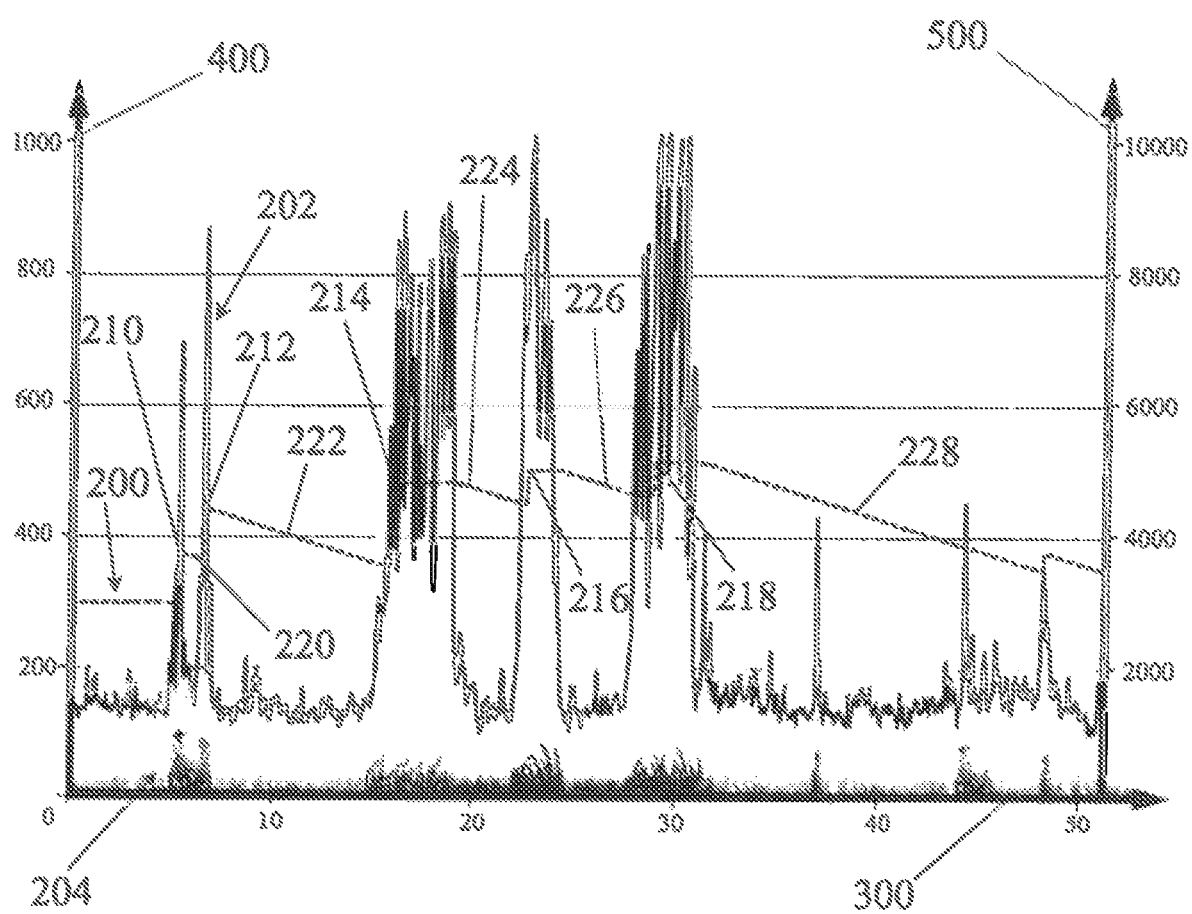
FIG. 4 is a graphic illustrating an example of development of an optimal rotation speed of the electric blade drive motor as required by the vegetation to be cut, for a mower according to the invention.

The graph of FIG. 4 provides an illustration of an example of variations of the optimal rotation speed of the blade drive motor in response to the signal of the optical sensors over a period of one minute.

The graph indicates on the vertical axis the intensity of the signal delivered by the optical sensors at a scale 400 going from 0 to 1000, as well as the optimal rotation speed of the blades, expressed in revolutions per minute (RPM) at a scale 500. The time, expressed in seconds, is shown in the horizontal axis 300. A curve 200, shown as a broken line, indicates the evolution of the optimal rotation speed as a function of time.

The graph also shows the evolution of a signal 202 delivered by the optical sensors as time passes.

Finally, a border 204 along the horizontal axis provides, an illustration of the vegetation seen by the optical sensors as times passes.

One should stress the particularly free character of the representation of the vegetation in one dimension, knowing that the measurement zone of the optical sensor(s) is a three-dimensional zone.

One can observe that different zones of vegetation of increasing height and density seen by the optical sensors, especially in the first 30 seconds of the graph, cause the successive development of the optimal rotation speed at values 210, 212, 214, 216 and 218. These values of optimal speed are obtained after sharp accelerations expressed by a sharply increasing ramp of the curve 200. They correspond to high amplitudes of the signal 202 of the optical sensor.

Piloting a sharp acceleration meets the need of attaining the optimal speed of the blades before the blades reach the zone of denser vegetation which gave rise to the selection of a higher optimal speed.

Inversely, zones of thinner vegetation, separating the zones of thicker vegetation of the border 204, correspond to phases of deceleration 222, 224, 226, 228 and to lower amplitudes of the signal of the optical sensors. One can observe that the deceleration slope of the optimal speed is less steep than the acceleration ramp. In the example shown, this avoids too brutal and too frequent variations of the rotation speed of the blades, as well as acoustic discomfort for the operator and/or overconsumption of electric energy of the battery.

The invention claimed is:

1. Electric battery-operated mower comprising:
   at least one cutting blade;
   an electric motor for driving the cutting blade;
   an electronic piloting unit of the electric motor;
   at least one optical sensor located upstream of the cutting blade, characterized in that
   the optical sensor is oriented towards the ground with an inclination in the forward direction of the mower, and configured to deliver, as the mower moves forwards, at least one predictive signal usable for determining, after processing, at least one of: height of plants to be cut, density of plants to be cut, and a combination of height and density of plants to be cut;
   the electronic piloting unit is configured to establish an optimal rotation speed of the cutting blade drive motor, the optimal rotation speed being established on the basis of said predictive signal of the optical sensor, and of a forward speed of the mower chosen between a standard forward speed, a desired forward speed, and an effective forward speed.

2. Mower according to claim 1, in which the optical sensor presents sensitivity within a range of luminous wave lengths between 400 and 1200 nm.

3. Mower according to claim 1, including a light source for a measurement zone of the optical sensor located in front of the cutting blade.

4. Mower according to claim 3, in which the light source is integrated into the optical sensor.

5. Mower according to claim 4, in which the light source is pulsed light source.

6. Mower according to claim 1, including furthermore a speed sensor to establish an effective forward speed signal of the mower and in which the piloting unit is connected to the speed sensor to establish the optimal rotation speed of the blade drive motor based of the predictive signal of the optical sensor and based on the signal of effective forward speed.

7. Mower according to claim 1, including an input interface of a desired forward speed, for the control of at least one electric motor for moving the mower forward, and in which the piloting unit is connected to the interface to establish the optimal rotation speed of the blade drive motor based on the predictive signal of the optical sensor and based on the desired forward speed.

8. Mower according to claim 1, in which the piloting unit is associated to a correspondence table with a plurality of reference rotation speeds of the drive motor, the piloting unit being configured to select the optimal rotation speed of the blade drive motor among a plurality of reference speeds of the correspondence table.

9. Mower according to claim 8 in which the piloting unit is configured to establish an acceleration or deceleration value, respectively, between a current optimal rotation speed of the blade drive motor and a new optimum rotation speed established during the forward movement of the mower.

10. Mower according to claim 8 in which the piloting unit is configured to establish the acceleration or deceleration value respectively, based on the forward speed of the mower.

11. Mower according to claim 1, including a signal processing card associated to the optical sensor, the signal processing card being configured to establish a contamination signal of the sensor.

12. Mower according to claim 11, including a plurality of optical sensors the signal processing card being configured to establish the predictive signal based on a measurement signal of each optical sensor.

13. Mower according to claim 1, in which the cutting blade is fitted along a cutting plane and in which the optical sensor presents a measurement axis inclined in a forward direction of the mower, with an angle of inclination relative to the cutting plane between 15 and 75°.

14. Mower according to claim 1, including a cutting casing housing the cutting blade, and in which the optical sensor presents a measuring zone located at a distance from the cutter casing between 10 cm and 30 cm and measured parallel to the forward motion of the mower.

15. Mower according to claim 1, characterized in that it is a walk-behind mower.

16. Piloting method of a drive motor of at least one cutting blade of an electric battery-operated mower, including:
   a predictive measurement upstream of the cutting blade, and during the forward movement of the mower, of at least one of a height of plants, a density of plants and a combination of a height and density of plants susceptible to reach the cutting blade;

the establishment of a forward speed of the mower;

the setting, as the mower moves forward, of an optimal rotation speed of the cutting blade drive motor, the optimal rotation speed being established on the basis of said predictive measurement, and on the basis of the forward speed of the mower;

the electric supply for the drive motor with sufficient energy to cause rotation of the drive motor of the cutting blade at the optimal rotation speed.

17. Method according to claim 16 in which the setting of the optimal rotation speed of the blade drive motor occurs periodically.

18. Method according to claim 16, including a temporary and automatic raise of the cutting blade, in case of setting an optimal rotation speed exceeding the capacity of either the electric motor or the battery supplying the electric motor.

19. Method of claim 16, including the emission of a warning signal in case of setting an optimal rotation speed exceeding the capacity of either the electric motor or the battery supplying the electric motor.

\* \* \* \* \*